United States Patent [19]

Archibald

[11] Patent Number: 4,704,955

[45] Date of Patent: Nov. 10, 1987

[54] COOKING APPARATUS

[76] Inventor: Stephen J. Archibald, P.O. Box 78313, Sandton, South Africa, 2146

[21] Appl. No.: 887,548

[22] Filed: Jul. 17, 1986

[51] Int. Cl.⁴ .............................................. A47J 37/07
[52] U.S. Cl. ...................................... 99/339; 99/425; 99/345
[58] Field of Search ................. 99/339, 444, 445, 446, 99/422, 425, 345, 448

[56] References Cited

U.S. PATENT DOCUMENTS

| | | | |
|---|---|---|---|
| 1,505,675 | 8/1924 | Stirn | 99/339 |
| 1,936,551 | 11/1933 | Garrison | 99/339 |
| 2,227,608 | 1/1941 | Tinnerman | 99/446 |
| 3,439,603 | 4/1969 | Reames | 99/339 X |
| 3,469,524 | 9/1969 | Trozzolo | 99/445 X |
| 3,509,814 | 5/1970 | Karapetian | 99/445 |
| 3,664,256 | 5/1972 | Peirce | 99/425 |
| 3,785,274 | 1/1974 | Yamamoto | 99/425 |
| 3,847,068 | 11/1974 | Beer et al. | 99/425 |
| 4,342,259 | 8/1982 | Lee | 99/446 X |
| 4,353,347 | 10/1982 | Seed | 99/446 X |

FOREIGN PATENT DOCUMENTS

| | | | |
|---|---|---|---|
| 2531329 | 2/1984 | France | 99/422 |
| 221268 | 8/1942 | Switzerland | 99/425 |
| 602071 | 7/1978 | Switzerland | 99/444 |

*Primary Examiner*—Stephen Marcus
*Assistant Examiner*—T. Graveline
*Attorney, Agent, or Firm*—McAulay, Fields, Fisher, Goldstein & Nissen

[57] ABSTRACT

Cooking apparatus includes a ploughshare shaped dish, the concave surface of which includes a plurality of raised formations on which food may be cooked. Drainage channels are defined on this surface, the channels leading to indentations defined in the operatively lowermost regions of the dish and in which, in use, basting liquids will collect. The dish includes a flat central region. The apparatus will preferably be adapted to be heated by a barbecue fire heat source and/or by gas from a gas container.

20 Claims, 4 Drawing Figures

COOKING APPARATUS

This invention relates to a cooking apparatus and in particular a cooking apparatus utilised for barbecues.

Barbecueing is a popular and traditional method of cooking food out of doors. A common appliance used to barbecue food is the "plough-share" barbecue. This is generally a shallow dish supported by legs. The dish is operatively placed over an open fire or gas heat source and any food to be cooked is placed in the dish. The advantage of this form of barbecue is that the food can be cooked in a sauce or its own juice which is contained in the dish. A disadvantage is that the food tends to migrate down the sides of the dish towards the centre and that food and the sauces accumulate in the centre of the dish. Where it is desired to cook different foods at the same time it is often preferable for some of the foods to be cooked to of the sauce and juice mix. Also certain foods cook better on a grid type surface.

It is accordingly an object of this invention to provide a "plough-share" barbecue which facilitates cooking of food.

In accordance with this invention, there is provided a cooking apparatus of the type described above, comprising a dish having a multiplicity of raised formations covering a major portion of the cooking surface of the dish.

Further there is provided for the raised formations to comprise a plurality of parallel rib formations. These parallel rib formations will preferably extend substantially circumferentially around at least a part of the cooking surface.

A feature of the invention provides for a plurality of liquid collection indentations set into the dish near the bottom thereof with the indentations preferably shaped correspondingly to common basting spoons.

A further feature of the invention provides for the dish to have a flat central region with a ridge encircling the central region and with the ridge having drainage channels therethrough.

It will be appreciated that the drainage channels communicate with the indentations such that liquids may drain to the indentations.

The invention also provides in combination a cooking apparatus as defined above having associated therewith a warming grid and having attached thereto a plurality of support legs.

The apparatus will preferably be manufactured from cast iron, may have a downwardly directed skirt depending from the undersurface of the dish, and may have formations on the undersurface thereof for connecting the dish to the outlet of a portable gas container. The dish may also have a handle associated therewith.

An embodiment of the invention described by way of examply only follows with reference to the accompanying drawings in which.

Figure 1:
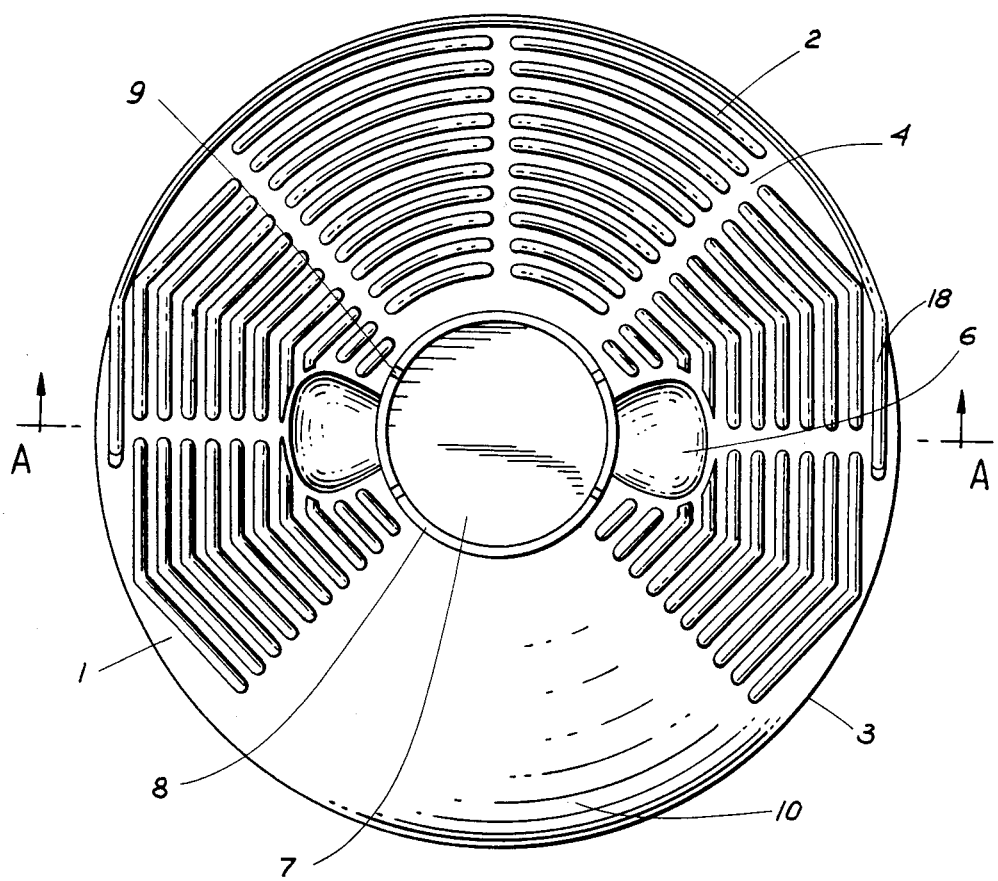
FIG. 1 is a plan view of one embodiment of the invention.
Figure 2:
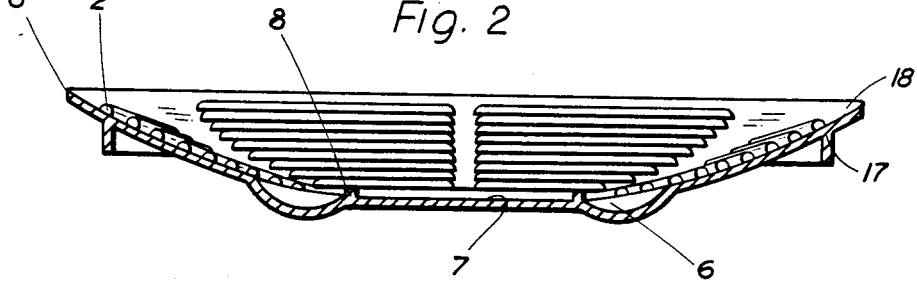
FIG. 2 is a sectional view along A—A of FIG. 1.

Referring firstly to FIGS. 1 and 2, there is provided a cooking apparatus in the form of a "plough-share" barbecue comprising a dish generally indicated by the numeral 1 having rib formations 2 defined on the concave surface thereof. The dish has a truncated conically-shaped side portion extending from the bottom thereof.

The rib formations 2 stand proud of the cooking surface of the dish and extend substantially parallel with each other and parallel with the rim 3 of the dish. The overall effect is a "stepped" or ripple like cooking surface. The rib formations are each broken at various points along their length, the combined effect of the breaks being to form radial drainage channels 4 which in use will convey juices from between adjacent ribs down to the central region of the dish.

The central region of the dish has two spoon shaped indentations 6 therein for the collection of drained cooking liquids. The indentations are preferably shaped correspondingly to common basting spoons such that such spoons may operatively be placed into the indentations to collect juices to baste the food being cooked.

The dish has a flat circular center 7 with a ridge 8 encircling this center, the ridge having half height slits 9 therethrough so that some of the liquid which collects in the center can drain into the basting indentations 6. The basting indentations thus define the operatively lowermost point of the cooking dish.

One radial section 10 of the dish has a smooth surface. This smooth surface can be used for cooking foodstuffs not suitably cooked on the ripple like cooking surface formed by the ridges.

Figure 3:
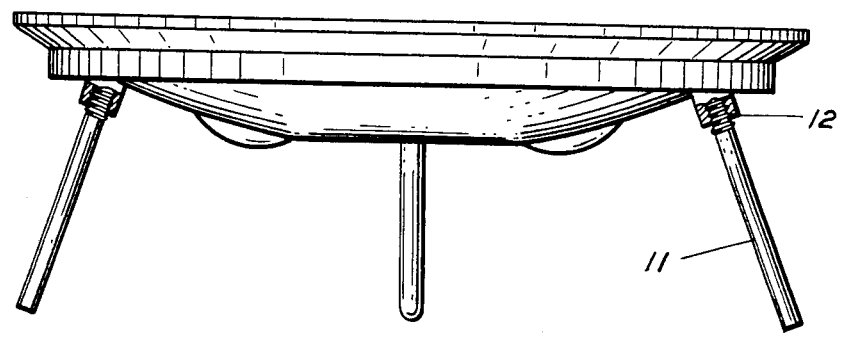
FIG. 3 is a sectional side view of the invention having support legs attached thereto.

Referring now to FIG. 3 the invention may optionally be provided with four female screw sockets 12 into each one of which a leg 11 may be screwed. The legs each having one end thereof threaded complimentarily to the sockets 12. This arrangement allows the dish to be supported off a heat source as desired.

Figure 4:
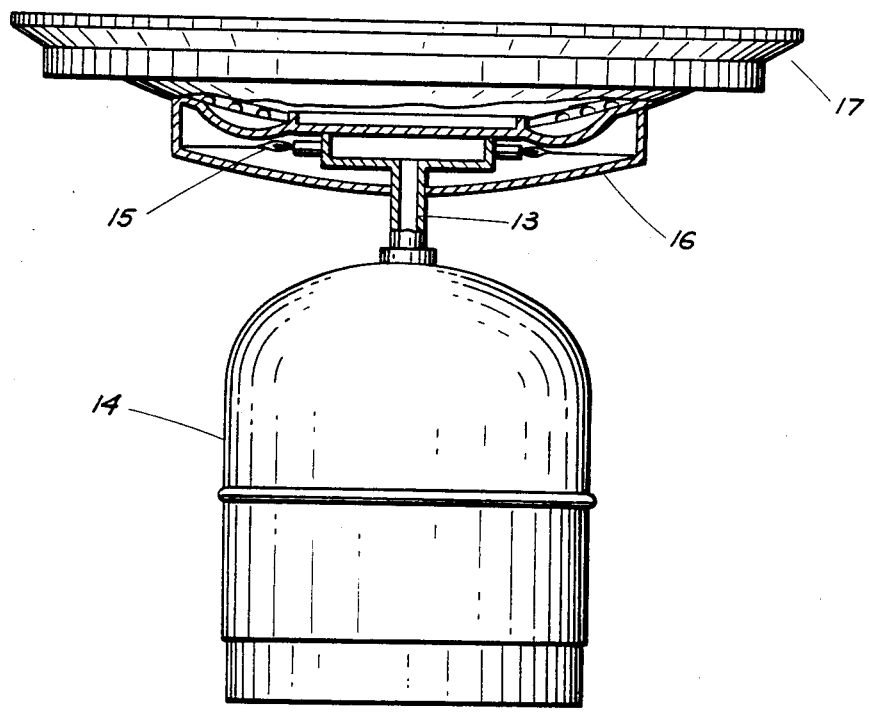
FIG. 4 is a sectional side view of the invention with a portable gas cylinder attached thereto.

The embodiment shown in FIG. 4 includes mounting means 13 to which the outlet from a portable gas cylinder 14 can connect to direct a flame 15 onto the undersurface of the dish. A flame guard 16 protects the flame in windy conditions. Also, a downwardly depending skirt 17 integrally formed around the periphery of the dish assists in flame protection and heat retention.

The invention may be provided with a warming grill of known type which fits over the top thereof and is supported by the upper edge of the dish.

It will be appreciated that the flat central region of the appliance facilitates the preparation of foodstuffs such as eggs, tomatoes, and the like which are difficult to prepare on sloping surfaces.

The ribs operatively enable the collection of cooking sauces on the sides of the dish enhancing the cooking process. The ribs further prevent foodstuffs from sliding toward the center of the dish.

It will be further appreciated that numerous variations may be made to the above described embodiments of the invention without departing from the scope hereof which is limited only to a cooking apparatus in the form of a "plough-share" barbecue comprising a dish having a multiplicity of raised formations which cover a major portion of the cooking surface of the dish. The formations may for example be in the form of inverted dimples rather than ribs. Other raised formations are also envisaged.

What is claimed is:

1. A cooking apparatus comprising a shallow cooking dish with an inner side having a uniformly continuous concave shaped food receiving surface portion and an outer side having a convex-shaped portion adapted to be heated by a heat source directed to said outer side of said dish, said inner side of said dish including a substantially flat circularly shaped bottom and a truncated conically-shaped side portion extending from said bottom and together with said bottom forming an interior for said food receiving portion and defining said concave-shaped food receiving portion, and a multiplicity of raised formations covering at least a major portion of said concave surface of the dish spaced from said flat bottom and substantially concentric therewith.

2. A cooking apparatus as claimed in claim 1, wherein one or more indentations are defined near the bottom of the dish and the truncated conically-shaped side portion of said concave surface of the dish has liquid drainage channels thereon directed such that, in use, liquid on the surface will drain into the indentation or indentations and away from said flat bottom.

3. A cooking apparatus as claimed in claim 1 wherein the dish is manufactured of cast iron.

4. A cooking apparatus as claimed in claim 1 wherein the dish is adapted to be supported on support legs.

5. A cooking apparatus as claimed in claim 1, wherein the convex side of the dish has a rigid skirt depending therefrom towards said flat bottom, but free of connection therewith.

6. A cooking apparatus as claimed in claim 1 wherein the dish is adapted to be mounted above and supported by a portable gas container.

7. A cooking apparatus as claimed in claim 1 wherein the apparatus has a handle by which it may be carried.

8. A cooking apparatus as claimed in claim 1, wherein said substantially flat bottom of the dish is encircled by a low ridge to define a central region.

9. A cooking apparatus as claimed in claim 8, wherein the low ridge has one or more drainage cuts formed therein for draining liquids away from said central region.

10. A cooking apparatus as claimed in claim 1, wherein the raised formations comprise a plurality of parallel rib formations for preventing of migration of food towards said flat bottom.

11. A cooking apparatus as claimed in claim 10, wherein said rib formations extend substantially circumferentially around at least part of the cooking surface and some of said rib formations lie in different parallel planes.

12. A cooking apparatus as claimed in claim 10, wherein the convex side of the dish has a rigid skirt depending therefrom with a uniformly continuous surface.

13. A cooking apparatus as claimed in claim 10, wherein the rib formations are substantially parallel with a perimeter rim of the dish to provide for a stepped cooking surface and the collection of cooking sauces on the inner side of the dish.

14. A cooking apparatus as claimed in claim 13, wherein said rib formations extend only part way around the truncated conically-shaped side portion and the remainder is a smooth portion, and said bottom of the dish is encircled by a low ridge to define a central region separating said smooth portion from said bottom.

15. A cooking apparatus as defined in claim 13, wherein one or more indentations are defined near the bottom of the dish and the truncated conically-shaped side portion of said concave surface of the dish has liquid drainage channels thereon directed such that, in use, liquid on the surface will drain into the indentation or indentations.

16. A cooking apparatus as claimed in claim 15, wherein the convex side of the dish has a rigid skirt with a uniformly continuous surface connected solely with said convex side for assisting in heat retention and flame protection.

17. A cooking apparatus as claimed in claim 10, wherein one or more indentations are defined near the bottom of the dish and below said flat bottom and said concave surface, and the truncated conically-shaped side portion of said concave surface of the dish has liquid drainage channels thereon directed into said indentation or indentations away from said flat bottom such that, in use, liquid on the surface will drain into the indentation or indentations and not onto said flat bottom.

18. A cooking apparatus as claimed in claim 17, wherein said bottom of the dish is encircled by a low ridge to define a central region, said indentations forming the operatively lowermost point of the cooking dish, said drainage channels cooperating with the channels between said rib formations for directing drainage juices into said indentations.

19. A cooking apparatus as claimed in claim 17, wherein said bottom of the dish is encircled by a low ridge to define a central region, said indentations forming the operatively lowermost point of the cooking dish and cooperating with said low ridge to prevent some of the liquids from draining into said central region.

20. A cooking apparatus as claimed in claim 19, wherein said low ridge has at least one drainage cut leading into one of said indentations for draining thereinto and away from said flat central region.

* * * * *